(12) United States Patent
Park et al.

(10) Patent No.: US 8,586,642 B2
(45) Date of Patent: Nov. 19, 2013

(54) AEROGEL, COMPOSITION FOR THE AEROGEL, AND METHOD OF MAKING THE AEROGEL

(75) Inventors: Sang-Ho Park, Yongin-si (KR); Myung-Dong Cho, Hwaseong-si (KR); Kwang-Hee Kim, Seoul (KR); Sung-Woo Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 130 days.

(21) Appl. No.: 13/072,137

(22) Filed: Mar. 25, 2011

(65) Prior Publication Data

US 2011/0237698 A1 Sep. 29, 2011

(30) Foreign Application Priority Data

Mar. 27, 2010 (KR) .................. 10-2010-0027602

(51) Int. Cl.
- *C08G 8/10* (2006.01)
- *C08J 9/00* (2006.01)

(52) U.S. Cl.
USPC ............... 521/64; 521/99; 521/113; 521/114; 521/181

(58) Field of Classification Search
USPC .............................. 521/64, 99, 113, 114, 181
See application file for complete search history.

(56) References Cited

U.S. PATENT DOCUMENTS

| | | | |
|---|---|---|---|
| 3,549,481 A | 12/1970 | Cesare et al. | |
| 4,873,218 A | 10/1989 | Pekala | |
| 4,966,919 A | 10/1990 | Williams, Jr. et al. | |
| 4,997,804 A | 3/1991 | Pekala | |
| 5,124,364 A | 6/1992 | Wolff et al. | |
| 5,137,927 A | 8/1992 | Wolff et al. | |
| 5,159,049 A | 10/1992 | Allen | |
| 5,389,288 A | 2/1995 | Rindo et al. | |
| 5,420,168 A | 5/1995 | Mayer et al. | |
| 5,484,818 A | 1/1996 | De Vos et al. | |
| 5,508,341 A | 4/1996 | Mayer et al. | |
| 5,945,084 A | 8/1999 | Droege | |
| 5,948,879 A | 9/1999 | Mori et al. | |
| 5,990,184 A | 11/1999 | Biesmans | |
| 6,040,375 A | 3/2000 | Behme et al. | |
| 6,316,092 B1 | 11/2001 | Frank et al. | |
| 6,503,655 B1 * | 1/2003 | Petricevic et al. | ............ 429/530 |
| 6,887,563 B2 | 5/2005 | Frank et al. | |
| 7,118,801 B2 | 10/2006 | Ristic-Lehmann et al. | |
| 7,282,466 B2 | 10/2007 | Long et al. | |
| 7,316,919 B2 | 1/2008 | Childs et al. | |
| 8,119,700 B2 | 2/2012 | Park et al. | |
| 2001/0038933 A1 | 11/2001 | Gebhardt et al. | |
| 2002/0173554 A1 | 11/2002 | Baumann et al. | |
| 2004/0063035 A1 | 4/2004 | Nagano et al. | |
| 2004/0142149 A1 | 7/2004 | Mollendorf et al. | |
| 2005/0131089 A1 | 6/2005 | Kocon et al. | |
| 2007/0036959 A1 | 2/2007 | Yamoto et al. | |
| 2007/0087120 A1 | 4/2007 | Connors, Jr. et al. | |
| 2007/0167534 A1 | 7/2007 | Coronado et al. | |
| 2007/0208124 A1 | 9/2007 | Schiraldi et al. | |
| 2007/0259169 A1 | 11/2007 | Williams et al. | |
| 2008/0087870 A1 | 4/2008 | Williams et al. | |
| 2008/0112876 A1 | 5/2008 | Dailey | |
| 2008/0188581 A1 | 8/2008 | Lee et al. | |
| 2008/0220333 A1 | 9/2008 | Yano et al. | |
| 2008/0287561 A1 | 11/2008 | Menashi et al. | |
| 2009/0029147 A1 | 1/2009 | Tang et al. | |
| 2009/0035344 A1 | 2/2009 | Thomas et al. | |
| 2010/0204347 A1 | 8/2010 | Park et al. | |
| 2010/0210810 A1 | 8/2010 | Katagiri et al. | |
| 2011/0071231 A1 | 3/2011 | Park et al. | |
| 2011/0105636 A1 | 5/2011 | Kim et al. | |
| 2011/0201713 A1 | 8/2011 | Kim et al. | |
| 2011/0245361 A1 | 10/2011 | Kim et al. | |
| 2011/0245362 A1 | 10/2011 | Hwang et al. | |
| 2011/0311802 A1 | 12/2011 | Cho et al. | |

FOREIGN PATENT DOCUMENTS

| | | |
|---|---|---|
| CN | 101525248 B | 7/2012 |
| DE | 1964188 A1 | 7/1970 |
| EP | 0994912 A | 1/1999 |
| EP | 0995773 A2 | 4/2000 |
| JP | 4732742 A | 11/1972 |
| JP | 05-319899 A | 12/1993 |
| JP | 2000-119433 A | 4/2000 |
| JP | 2008132676 A | 6/2008 |
| JP | 2008221385 A | 9/2008 |
| JP | 2008231258 A | 10/2008 |
| KR | 19967003975 A | 8/1996 |
| KR | 1019990044531 A | 6/1999 |
| KR | 10-0282964 B1 | 12/2000 |
| KR | 1020010017538 A | 3/2001 |
| KR | 1020040011915 A | 2/2004 |
| KR | 1020040106289 A | 12/2004 |

(Continued)

OTHER PUBLICATIONS

European Extended Search Report—EP 10191930.6 dated May 11, 2011.

Aaltonen, O. et al., The preparation of lignocellulosic aerogels from ionic liquid solutions, Carbohydrate Polymers, 2009, vol. 75: 125-129.

Al-Muhtaseb, S.A. et al., Preparation and Properties of Resorcinol-Formaldehyde Organic and Carbon Gels, Advanced Materials, 15,101-114 (2003).

Aoki, H. et al., Basic Study of the Gelation of Dimethacrylate-Type Crosslinking Agents, J. of Polymer Sci Part A: Polymer Chem, 2006, 44: 949-958.

(Continued)

*Primary Examiner* — Irina S Zemel
(74) *Attorney, Agent, or Firm* — Cantor Colburn LLP

(57) ABSTRACT

An aerogel including a polymerization product of a first monomer selected from an aryl polyol compound including at least two aryl groups linked to each other by a linker, an aryl polyol compound including at least two aryl groups fused to each other, or a combination thereof, and a second monomer including a benzene substituted with at least two hydroxyl groups.

8 Claims, 2 Drawing Sheets

(56) References Cited

FOREIGN PATENT DOCUMENTS

| | | |
|---|---|---|
| KR | 1020050037557 A | 4/2005 |
| KR | 1020050073500 A | 7/2005 |
| KR | 1020050118119 A | 12/2005 |
| KR | 1020060099514 A | 9/2006 |
| KR | 10-0666110 B1 | 1/2007 |
| KR | 1020090059321 A | 6/2009 |
| KR | 1020090061301 A | 6/2009 |
| KR | 10-0911845 B | 8/2009 |
| WO | 96/26915 A1 | 9/1996 |
| WO | 2008104491 A1 | 9/2008 |
| WO | 2008114524 A1 | 9/2008 |
| WO | 2009033070 A1 | 3/2009 |

OTHER PUBLICATIONS

Capadona, L. A. et al., Flexible, Low-Density Polymer Crosslinked Silica Aerogels. Polymer, 2006; vol. 47: 5754-5761.

Chowdhury, R., Electron-Beam-Induced Crosslinking of Natural Rubber/Acrylonitrile•Butadiene Rubber Latex Blends in the Presence of Ethoxylated Pentaerythritol Tetraacrylate Used as a Crosslinking Promoter, J. of Applied Polymer Sci, 2007, vol. 103 (2): 1206-1214.

EP Extended Search Report for Application No. 11170821.0 dated Nov. 30, 2011.

Feldmann C., "Polyol-Medicated Synthesis of Nanoscale Functional Materials", Advanced Functional Materials, 2003, vol. 13(2): 101-107.

Fischer, F. et al., Cellulose-based aerogels, Polymer, 2006, vol. 47: 7636-7645.

Gavillon, R. et al., Aerocellulose: New Highly Porous Cellulose Prepared from Cellulose—NaOH Aqueous Solutions, Biomacromolecules, 2008, vol. 9: 269-277.

Gu, W. et al., Polymerized Gels and 'Reverse Aerogels' from Methyl Methacrylate or Styrene and Tetraoctadecylammonium Bromide as Gelator, Chem. Commun. 1997, 6, pp. 543-544.

Hebb, A. et al., Synthesis of porous cross-linked polymer monoliths using 1,1,1,2-tetrafluoroethane (R134a) as the porogen, Composites Science and Technology, 2003, vol. 63: 2379-2387.

Hoepfner, S. et al., Synthesis and characterisation of nanofibrillar cellulose aerogels, Cellulose, 2008, vol. 15: 121-129.

Husing, N. et al., "Aerogels—Airy Materials: Chemistry, Structure, and Properties", Angew. Chem. Int. Ed., 1998, vol. 37: 22-45.

Innerlohinger, J. et al., Aerocellulose: Aerogels and Aerogel-like Materials made from Cellulose, Macromol. Symp., 2006, vol. 244: 126-135.

Jin, H. et al., Nanofibrillar cellulose aerogels, Colloids and Surfaces A: Physicochem. Eng. Aspects, 2004, vol. 240 (1-3): 63-67.

Kaczmarek, H. et al., Networks of Photocrosslinked Poly(meth)acrylates in Linear Poly(vinyl chloride), Networks of, J. Appl. Polym. Sci., 2002, 86, 375-3734.

Kanamori, K. et al., New Transparent Methylsilsesquioxane Aerogels and Xerogels with Improved Mechanical Properties, Advanced Materials, 2007, vol.19(12): 1589-1593.

Katanyoota, P. et al., Novel polybenzoxazine-based carbon aerogel electrode for supercapacitors, Materials Science and Engineering: B, 2010, vol. 167(1): 36-42.

Leventis, N. et al., Nanoengineering Strong Silica Aerogels, Nano Letters, 2002, vol. 2 (9): 957-960.

Liebner, F. et al., Cellulose aerogels: highly porous, ultra-lightweight materials, Holzforschung, 2008, vol. 62: 129-135.

Liebner, F. et al., Cellulosic aerogels as ultra-lightweight materials. Part 2: synthesis and properties, Holzforschung, 2009, vol. 63: 3-11.

Long, D. et al. "Molecular design of polymer precursors for controlling microstructure of organic and carbon aerogels", Journal of Non-Crystalline Solids, 2009,: vol. 355(22-23): 1252-1258.

Lorjai, P. et al., "Porous Structure of Polybenzoxazine-based organic aerogel prepared by sol-gel process and their carbon aerogels", J Sol-Gel Sci Technol, 2009, vol. 52(1): 56-64.

Mulik, S. et al, Cross-Linking 3D Assemblies of Nanoparticles into Mechanically Strong Aerogels by Surface-Initiated Free-Radical Polymerization, Chem. Mater., 2008, 20 (15): 5035-5046.

Paguio, R.R. et al., Fabrication Capabilities for Spherical Foam Targets Used in ICF Experiments,17th Target Fabrication Specialist Meeting, San Diego, CA, Oct. 1-5, 2006. Also published on IEEE Xplore.

Rozenberg, B.A. et al., "High-performance Bismaleimide Matrices: Cure Kinetics and Mechanism" Polymers for Advanced Technologies, 2002, vol. 13 (10-12): 837-844.

Science Magazine, Editor's Choice Section, "Materials Science Spongy Clay?", Oct. 21, 2005, vol. 310; 5747: 407c.

Tan, C. et al., Organic Aerogels with Very High Impact Strength, Advanced Materials, 2001, vol. 13 (9): 644-646.

Wiener, M. et al., "Carbon Aerogel-Based High-Temperature Thermal Insulation", Int J. Thermophys, 2009, vol. 30 (4):1372-1385.

Iler, R.K., "The Chemistry of Silica: Solubility, Polymerization, Colloid and Surface Properties and Biochemistry of Silica", John Wiley & Sons, N.Y. (1978).

Jirglova, H. et al., Synthesis and Properties of Phloroglucinol-Phenol-Formaldehyde Carbon Aerogels and Xerogels, Langmuir, 2009; 25(4): 2461-2466.

Leventis, N., Three-Dimensional Core-Shell Superstructures: Mechanically Strong Aerogels, Acc Chem Res., 2007; 40 (9): 874-884. Epub May 9, 2007.

Mulik, S. et al., Time-Efficient Acid-Catalyzed Synthesis of Resorcinol-Formaldehyde Aerogels, Chem. Mater. 2007, 19: 6138-6144.

Pekala, R. W. et al., Structure of Organic Aerogels. 1. Morphology and Scaling, Macromolecules, 1993; 26(20): 5487-5493.

Chaisuwan, T. et al., "Novel Carbon Aerogel Prepared from Benzoxazine Precursors via Ambient Drying: Effect of Amine Derivatives", PMSE Preprints, vol. 100, Spring 2009, 3 pages.

Chaisuwan, T. et al., "Removal of heavy metals from model wastewater by using polybenzoxazine aerogel", Desalination 256 (2010), pp. 108-114.

Katanyoota, P., et al., "Novel polybenzoxazine-based carbon aerogel electrode for supercapacitors," Materials Science and Engineering B, vol. 167, 2010, pp. 36-42.

Komalwanich, T. et al., "Removal of Heavy Metals from Wastewater by Polybenzoxazine-based Aerogel", PMSE Preprints, vol. 100, Spring 2009, 3 pages.

Yang, J. et al., "Compressive behaviors and morphological changes of resorcinol-formaldehyde aerogel at high strain rates", Microporous and Mesoporous Materials, vol. 133, 2010, pp. 134-140.

Pekala, R.W. "Organic aerogels from the polycondensation of resorcinol with formaldehyde", Journal of Materials Science, 1989, 24(9): 3221-3227.

EP Search Report for Application No. 11158144.3 dated Jul. 29, 2011.

* cited by examiner

AEROGEL, COMPOSITION FOR THE AEROGEL, AND METHOD OF MAKING THE AEROGEL

CROSS-REFERENCE TO RELATED APPLICATION

This application claims priority to Korean Patent Application No. 10-2010-0027602, filed on Mar. 27, 2010, and all the benefits accruing therefrom under 35 U.S.C. §119, the content of which in its entirety is herein incorporated by reference.

BACKGROUND

1. Field

This disclosure relates to an aerogel, a composition for preparing an aerogel, and a method of making the aerogel.

2. Description of the Related Art

An aerogel is a mesoporous material having a nanometer-sized three-dimensional mesh structure. Because the aerogel has desirable adiabatic and sound absorption properties, the aerogel may be applied to a diverse variety of technologies. In particular, an aerogel may be usefully applied to a cooling device, such as a refrigerator or a freezer, and may be used as an adiabatic material in aerospace applications and for building construction.

Aerogels may be categorized as an inorganic aerogel or an organic aerogel according to the material of the aerogel. An example of an inorganic aerogel is a silica aerogel. An organic aerogel includes an organic linking group therein, and thus is more flexible than an inorganic aerogel.

SUMMARY

An organic aerogel may have various properties depending on its chemical structure and the manufacturing process used to produce the aerogel.

An aspect of this disclosure provides an aerogel having improved properties.

Another aspect of this disclosure provides an aerogel composition for providing the aerogel.

A further aspect of this disclosure provides a method of making the aerogel.

According to an aspect of this disclosure, an aerogel is provided that includes a polymerization product of a first monomer selected from an aryl polyol compound including at least two aryl groups linked to each other by a linker, an aryl polyol compound including at least two aryl groups fused to each other, or a combination thereof, a second monomer including a benzene substituted with at least two hydroxyl groups, and a third monomer of an aldehyde compound.

According to another aspect of this disclosure, an aerogel composition for preparing an aerogel is provided, wherein the aerogel composition includes a first monomer selected from an aryl polyol compound including at least two aryl groups linked to each other by a linker, an aryl polyol compound including at least two aryl groups fused to each other, or a combination thereof; a second monomer including a hydroxyl group-containing $C_6$ aryl group; an aldehyde compound; and a solvent.

According to yet another aspect of this disclosure, a method of preparing an aerogel is provided that includes contacting a first monomer selected from an aryl polyol compound including at least two aryl groups linked to each other by a linker, an aryl polyol compound including at least two aryl groups fused to each other, or a combination thereof; a second monomer including a polyhydroxyl group-containing $C_6$ aryl group; and a third monomer of an aldehyde compound in a solvent to obtain a mixture; polymerizing the mixture to obtain a wet gel; and drying the wet gel to prepare the aerogel.

The aryl polyol compound including at least two aryl groups linked to each other by a linker may be represented by the following Chemical Formula 1.

Chemical Formula 1

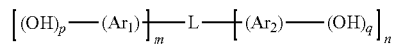

In the above Chemical Formula 1, $Ar_1$ and $Ar_2$ are the same or different, and are a substituted or unsubstituted C6 to C30 aryl group, a substituted or unsubstituted C3 to C30 heteroaryl group, a substituted or unsubstituted C7 to C30 alkylaryl group, or a combination thereof, L is a single bond, —O—, —C(O)—, —S—, —S(O)$_2$—, —P(O)—, —P(RR'R")— wherein R, R', and R" are the same or different and are hydrogen, a C1 to C10 alkyl group, or a C6 to C20 aryl group, or a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C12 to C18 arylalkylaryl group, a substituted or unsubstituted C1 to C30 heteroalkyl group, a substituted or unsubstituted C2 to C30 heterocycloalkyl group, a substituted or unsubstituted C2 to C30 alkenyl group, or a combination thereof, n and m are the same or different and are an integer ranging from 1 to 5, with the proviso that n+m is selected so that a valence of L is not exceeded, p and q are the same or different and are an integer ranging from 1 to 4.

The aryl polyol compound including at least two aryl groups fused with each other may be represented by the following Chemical Formula 2.

 Chemical Formula 2

In the above Chemical Formula 2, $Ar_3$ is a substituted or unsubstituted fused C10 to C30 aryl group, a substituted or unsubstituted fused C7 to C30 arylalkyl group, a substituted or unsubstituted fused C2 to C30 heteroaryl group, or a combination thereof, and r and s are the same or different and are an integer ranging from 1 to 5.

Examples of an aryl polyol compound including at least two aryl groups linked to each other by a linker of above Chemical Formula 1 may be represented by a compound of the following Chemical Formula 3.

Chemical Formula 3

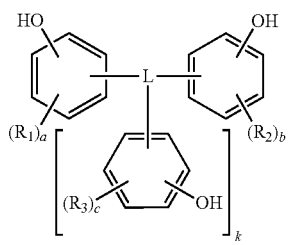

In the above Chemical Formula 3,

L is a single bond, —O—, —C(O)—, —S—, —S(O)$_2$—, —P(O)—, —P(RR'R")— wherein R, R', and R" are the same or different and are hydrogen, a C1 to C10 alkyl group, or a C6 to C20 aryl group, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C12 to C18 arylalkylaryl group, a substituted or unsubstituted C1 to C30 heteroalkyl group, a substituted or unsubstituted C2 to C30 heterocycloalkyl group, a substituted or unsubstituted C2 to C30 alkenyl group, or a combination thereof, and $R_1$, $R_2$, and $R_3$ are the same or different, and are hydrogen, a substituted or unsubstituted C1 to C10 alkyl group, a substituted or unsubstituted C1 to C10 alkoxy group, $NR^aR^b$, —$OR^a$, —$NH(CO)R^a$, —$OC(O)R^a$, a substituted or unsubstituted C6 to C18 aryl group, a phenyl group, or —$CH=CR^a$, or a combination thereof, wherein $R^a$ and $R^b$ are the same of different and are hydrogen or a substituted or unsubstituted C1 to C10 alkyl group, a, b, and c are the same or different and are an integer ranging from 0 to 4, and k is an integer ranging from 0 to 3.

In the above Chemical Formulae 1 and 3, at least one of $R_1$, $R_2$, and $R_3$ may be a substituted or unsubstituted C1 to C10 alkyl group, a substituted or unsubstituted C1 to C10 alkoxy group, —$NR^aR^b$, OR, —$NH(CO)R^a$, —$OC(O)R^a$, a substituted or unsubstituted C6 to C18 aryl group, a phenyl group, or —$CH=CR^a$, or a combination thereof, and $R^a$ and $R^b$ are the same or different and are hydrogen or a substituted or unsubstituted C1 to C10 alkyl group.

L of Chemical Formulae 1 and 3 may be a linker represented by the following Chemical Formula 4A and Chemical Formula 4B.

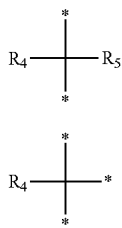

Chemical Formula 4A

Chemical Formula 4B

In the above Chemical Formulae 4A and 4B, $R_4$ and $R_5$ are the same or different, and are a substituted or unsubstituted C1 to C10 alkyl group, a substituted or unsubstituted C1 to C10 alkoxy group, a substituted or unsubstituted C3 to C20 cycloalkyl group, a substituted or unsubstituted C6 to C18 aryl group, or a substituted or unsubstituted C12 to C18 arylalkylaryl group wherein $R_4$ and $R_5$ are optionally fused to form a ring.

Examples of the linker L of above Chemical Formulae 4A and 4B may be represented by the following Chemical Formulae 4-1 to 4-6.

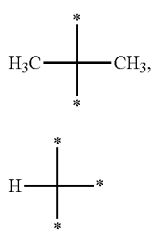

Chemical Formula 4-1

Chemical Formula 4-2

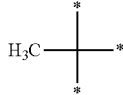

Chemical Formula 4-3

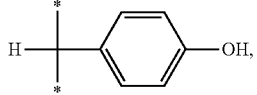

Chemical Formula 4-4

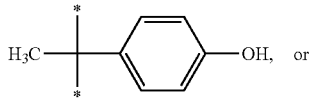

Chemical Formula 4-5

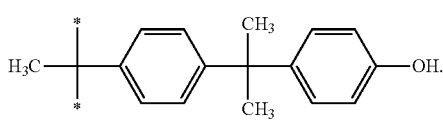

Chemical Formula 4-6

An example of a linker L forming a fused ring connected with $R_4$ and $R_5$ of the above Chemical Formula 4 may be represented by the following Chemical Formula 5.

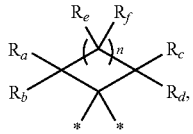

Chemical Formula 5

In the above Chemical Formula 5, $R_a$ to $R_f$ are the same or different and are hydrogen, a C1 to C10 alkyl group, or a C6 to C20 aryl group, and n is an integer ranging from 1 to 5, and "*" represents a point of connection to a hydroxy-substituted benzene group of Chemical Formula 3.

The first monomer may be included in an amount of about 1 to about 99 parts by weight, based on 100 parts by weight of the second monomer.

The aerogel may have pores having a dimension of about 1 to about 50 nanometers (nm), and may have porosity of about 80 to about 99 percent (%) based on the total volume of the aerogel.

The aerogel may have a specific surface area of about 200 to about 800 square meters per gram (m²/g).

The solvent may include an organic solvent. The organic solvent may include dimethyl formamide ("DMF"), acetone, 1,4-dioxane, tetrahydrofuran, dimethylsulfoxide, toluene, benzene, dichlorobenzene, acetonitrile, alcohol, or a combination thereof.

The composition for preparing an aerogel may further include a catalyst. The catalyst may be an acid catalyst.

The aerogel may have a shrinkage of 25% or less, based on a total volume of a wet gel.

Also disclosed is an aerogel composition including: a first monomer including a compound represented by Chemical Formula 1, Chemical Formula 2, or a combination thereof:

Chemical Formula 1

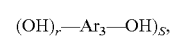

Chemical Formula 2 wherein, in the above Chemical Formula 1, $Ar_1$ and $Ar_2$ are the same or different, and are a substituted or unsubstituted C6 to C30 aryl group, L is a single bond, —O—, —C(O)—, —S—, —S(O)$_2$—, a substituted or unsubstituted C1 to C30 alkyl group, a substituted or unsubstituted C6 to C30 aryl group, a substituted or unsubstituted C7 to C30 arylalkyl group, a substituted or unsubstituted C12 to C18 arylalkylaryl group, or a combination thereof, n and m are the same or different and are an integer ranging from 1 to 3, with the proviso that n+m is selected so that a valence of L is not exceeded, and p and q are the same or different and are an integer ranging from 1 to 4, and wherein in Chemical Formula 2, Ar₃ is a substituted or unsubstituted fused C10 to C30 aryl group, and r and s are the same or different and are an integer ranging from 1 to 3;

a second monomer represented by the following Chemical Formula 6:

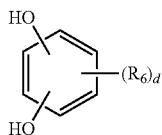

Chemical Formula 6 wherein in the above Chemical Formula 6,

R₆ is selected from hydrogen, a hydroxyl group, a substituted or unsubstituted C1 to C10 alkyl group, a substituted or unsubstituted C1 to C10 alkoxy group, or a combination thereof, and d is an integer of 1 or 2;

a third monomer of an aldehyde compound; and a solvent.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
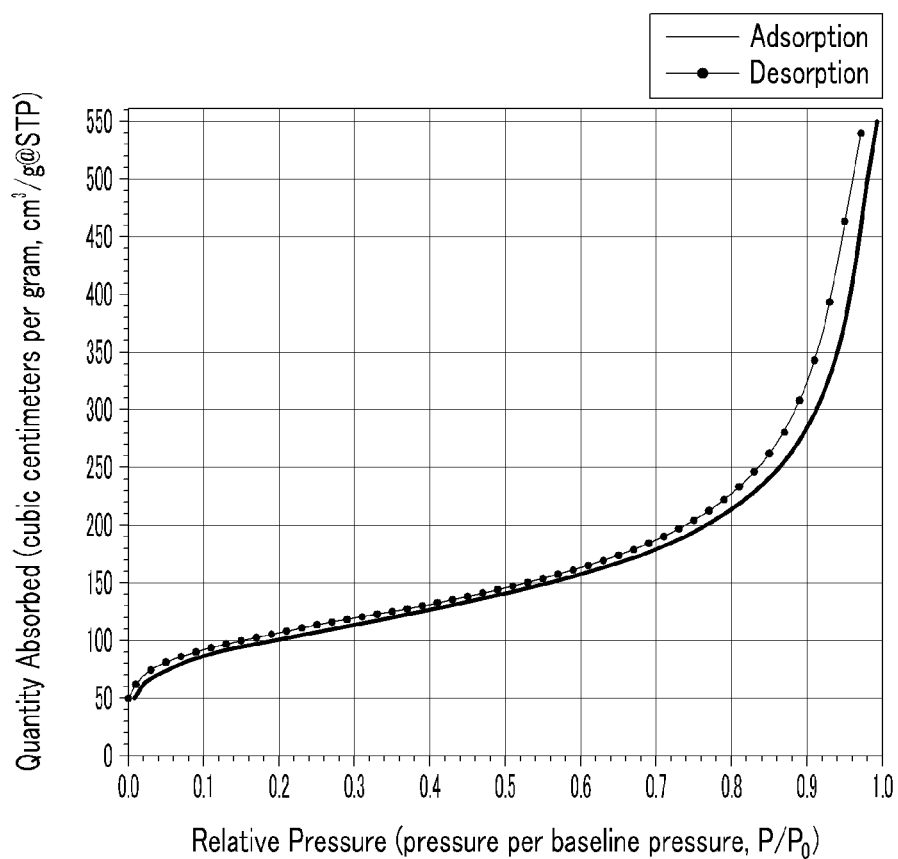
FIG. 1 is a graph of quantity of nitrogen absorbed (cubic centimeters per gram an standard temperature and pressure) versus relative pressure (pressure per baseline pressure) showing a nitrogen (N₂) adsorption-desorption isotherm of an organic aerogel prepared according to Example 1.

Embodiments will hereinafter be described in further detail with reference to the accompanying drawings, in which various embodiments are shown. Rather, these embodiments are provided so that this disclosure will be thorough and complete, and will fully convey the scope of the invention to those skilled in the art. Like reference numerals refer to like elements throughout. This disclosure may, however, be embodied in many different forms and shall not be construed as limited to the embodiments set forth herein.

As used herein, the term "and/or" includes any and all combinations of one or more of the associated listed items. It will be understood that, although the terms "first," "second," "third" etc. may be used herein to describe various elements, components, regions, layers and/or sections, these elements, components, regions, layers and/or sections shall not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Alkyl" means a straight or branched chain saturated aliphatic hydrocarbon having the specified number of carbon atoms and having a valence of at least one, optionally substituted with one or more substituents where indicated, provided that the valence of the alkyl group is not exceeded.

"Alkenyl" means a straight or branched chain hydrocarbon that comprises at least one carbon-carbon double bond and having a valence of at least one, optionally substituted with one or more substituents where indicated, provided that the valence of the alkenyl group is not exceeded.

"Alkoxy" means an alkyl group that is linked via an oxygen (i.e., —O-alkyl). Nonlimiting examples of alkoxy groups include methoxy groups, ethoxy groups, propoxy groups, isobutyloxy groups, sec-butyloxy groups, pentyloxy groups, iso-amyloxy groups, and hexyloxy groups.

"Cycloalkyl" means a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the cycloalkyl group is not exceeded. Cycloalkyl groups do not include an aromatic ring or a heterocyclic ring. When the numbers of carbon atoms is specified (e.g., C3 to C15 cycloalkyl), the number means the number of ring members present in the one or more rings.

"Aryl" means a cyclic group in which all ring members are carbon and all rings are aromatic, the group having the specified number of carbon atoms, and having a valence of at least one, optionally substituted with one or more substituents where indicated, provided that the valence of the aryl group is not exceeded. More than one ring may be present, and any additional rings may be independently aromatic, saturated or partially unsaturated and multiple rings, if present, may be fused, pendant, spirocyclic or a combination thereof.

"Arylalkyl" means a substituted or unsubstituted aryl group covalently linked to an alkyl group that is linked to a compound (e.g., a benzyl is a C7 arylalkyl group). "Arylalkylaryl" means a substituted or unsubstituted aryl group covalently linked to an alkyl group that is covalently linked to an aryl group that is linked to a compound (e.g., a 4-hydroxyphenyl-2,2-dimethylmethyene-4-phenylene group is a C13 arylalkylaryl group).

"Heterocycloalkyl" means a group having the indicated number of carbons and including at least one non-aromatic ring that contains a heteroatom ring member. Heterocycloalkyl groups do not include an aromatic ring or a heterocyclic ring. When the numbers of carbon atoms is specified (e.g., C2 to C15 heterocycloalkyl), the number means the number of ring members present in the one or more rings.

"Heteroaryl" means a group including at least one aromatic ring that contains a heteroatom ring member. Non-aromatic and/or carbocyclic rings may also be present in a heteroaryl group, provided that at least one ring is both aromatic and contains a ring member that is a heteroatom. More than one ring may be present, and any additional rings may be independently aromatic, saturated or partially unsaturated and multiple rings, if present, may be fused, pendant, spirocyclic or a combination thereof.

"Polyol" means a compound containing at least 2 (e.g., 2 to 10, specifically 2 to 6) hydroxyl groups.

As used herein, when a definition is not otherwise provided, "substituted" means that a compound or radical is substituted with one or more (e.g., 1-)4 substituents selected from a C1 to C30 alkyl group, a C2 to C30 alkenyl group, a C2 to C30 alkynyl group, a C6 to C30 aryl group, a C7 to C30 alkylaryl group (e.g., a 4-methylphenylene), a C1 to C4 oxyalkyl group (e.g., a 1-oxoethyl group), a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br, or I), a hydroxyl group, a C1 to C15 alkoxy group, a nitro group, a cyano group, an amino group, an azido group, an amidino group, a hydrazine group, a hydrazono group, a carbonyl group, a carbamyl group, a thiol group, a C1 to C30 ester group, a carboxyl group or a salt thereof, a sulfonic acid group or a salt thereof, a phosphoric acid group or a salt thereof, or a combination thereof, instead of a hydrogen, provided that the substituted compound or group's normal valence is not exceeded.

As used herein, when a definition is not otherwise provided, "hetero" means a group or compound that has 1 to 3 heteroatoms selected from N, O, S, or P, and which can be the same or different.

A used herein, an "aerogel" may include an ambigel, a xerogel, a cryogel, or the like. Hereinafter, an aerogel according to an embodiment is further disclosed.

According to an embodiment, the aerogel is an organic aerogel comprising a polymer and having a plurality of micropores.

The polymer may be synthesized by polymerizing a first monomer comprising an aryl polyol compound including at least two aryl groups linked to each other by a linker, an aryl polyol compound comprising at least two aryl groups fused to each other, or a combination thereof, a second monomer including a hydroxyl group-containing $C_6$ aryl group, and a third monomer of an aldehyde compound.

The aryl polyol compound comprising at least two aryl groups linked to each other by a linker may be represented by the following Chemical Formula 1.

Chemical Formula 1

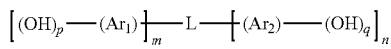

In the above Chemical Formula 1,
$Ar_1$ and $Ar_2$ are the same or different, and are a substituted or unsubstituted C6 to C30 aryl group, a substituted or unsubstituted C3 to C30 heteroaryl group, or a substituted or unsubstituted C7 to C30 alkylaryl group, or a combination thereof, L is a single bond, —O—, —S—, —S(O)$_2$—, —P(O)—, —P(RR'R")— (wherein R, R', and R" are the same or different, and are hydrogen, a C1 to C10 alkyl group, or a C6 to C20 aryl group), a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted. C12 to C18 arylalkylaryl group, a substituted or unsubstituted C1 to C30 heteroalkyl group, a substituted or unsubstituted C2 to C30 heterocycloalkyl group, a substituted or unsubstituted C2 to C30 alkenyl group, or a combination thereof, n and m are the same or different and are an integer ranging from 1 to 5, with the proviso that n+m is selected so that a valence of L is not exceeded, and p and q are the same of different and are an integer ranging from 1 to 4.

In an embodiment, $Ar_1$ and $Ar_2$ are the same or different, and are a substituted or unsubstituted C6 to C30 aryl group; L is a single bond, —O—, —C(O)—, —S—, —S(O)$_2$—, a substituted or unsubstituted C1 to C30 alkyl group, a substituted or unsubstituted C6 to C30 aryl group, a substituted or unsubstituted C7 to C30 arylalkyl group, a substituted or unsubstituted C12 to C18 arylalkylaryl group, or a combination thereof, n and m are the same or different and are an integer ranging from 1 to 3, with the proviso that n+m is selected so that a valence of L is not exceeded, and p and q are the same or different and are an integer ranging from 1 to 4.

Examples of a compound of the above Chemical Formula 1 include a compound of the following Chemical Formula 3.

Chemical Formula 3

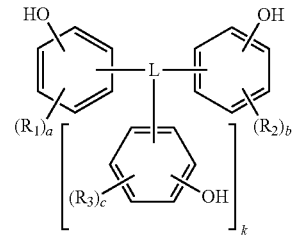

In the above Chemical Formula 3,
L is a single bond, —O—, —C(O)—, —S—, —S(O)$_2$—, —P(O)—, —P(RR'R")— (wherein R, R', and R" are the same or different, and are hydrogen, a C1 to C10 alkyl group, or a C6 to C20 aryl group), or a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C12 to C18 arylalkylaryl group, a substituted or unsubstituted C1 to C30 heteroalkyl group, a substituted or unsubstituted C2 to C30 heterocycloalkyl group, a substituted or unsubstituted C2 to C30 alkenyl group, or a combination thereof, $R_1$, $R_2$, and $R_3$ are the same or different, and are hydrogen, a substituted or unsubstituted C1 to C10 alkyl group, a substituted or unsubstituted C1 to C10 alkoxy group, —NR$^a$R$^b$, OR$^a$, —NH(CO)R$^a$, —OC(O)R$^a$, a substituted or unsubstituted C6 to C18 aryl group, a phenyl group, —CH=CR$^a$, or a combination thereof, wherein R$^a$ and R$^b$ are the same of different and are hydrogen or a substituted or unsubstituted C1 to C10 alkyl group, a, b, and c are the same or different and are an integer ranging from 0 to 4 and specifically 0 to 3, and k is an integer ranging from 0 to 3.

In the above Chemical Formula 3, at least one of $R_1$, $R_2$, and $R_3$ may be a substituted or unsubstituted C1 to C10 alkyl group, a substituted or unsubstituted C1 to C10 alkoxy group, —$NR^aR^b$, —$OR^a$, —$NH(CO)R^a$, —$OC(O)R^a$, a substituted or unsubstituted C6 to C18 aryl group, a phenyl group, or —CH=$CR^a$, or a combination thereof, and $R^a$ and $R^b$ are the same or different and are hydrogen or a substituted or unsubstituted C1 to C10 alkyl group.

L in Chemical Formulae 1 and 3 may be a linker represented by the following Chemical Formula 4A and Chemical Formula 4B.

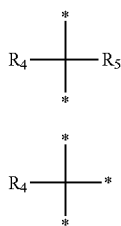

Chemical Formula 4A

Chemical Formula 4B

In the above Chemical Formulae 4A and 4B, $R_4$ and $R_5$ are the same or different, and are a substituted or unsubstituted C1 to C10 alkyl group, a substituted or unsubstituted C1 to C10 alkoxy group, a substituted or unsubstituted C3 to C20 cycloalkyl group, a substituted or unsubstituted C6 to C18 aryl group, or a substituted or unsubstituted C12 to C18 arylalkylaryl group, wherein $R_4$ and $R_5$ are optionally fused to form a ring, and "*" of Chemical Formulae 4A and 4B represents a point of connection to a hydroxy-substituted benzene group of Chemical Formula 3.

In a specific embodiment, $R_4$ and $R_5$ are the same or different, and are a substituted or unsubstituted C1 to C10 alkyl group, a substituted or unsubstituted C6 to C18 aryl group, or a substituted or unsubstituted C12 to C18 arylalkylaryl group.

Examples of the linker of above Chemical Formula 4A and 4B include the following Chemical Formulae 4-1 to 4-6.

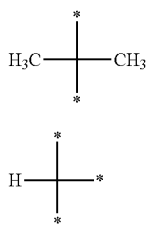

Chemical Formula 4-1

Chemical Formula 4-2

Chemical Formula 4-3

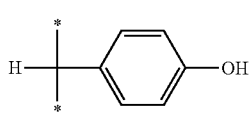

Chemical Formula 4-4

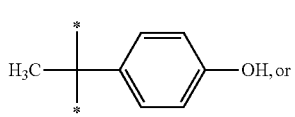

Chemical Formula 4-5

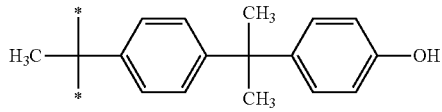

Chemical Formula 4-6

In the above Chemical Formulae 4-1 to 4-6, "*" represents a point of connection to a hydroxy-substituted benzene group of Chemical Formula 3.

An example of a linker L forming a fused ring connected with $R_4$ and $R_5$ of the above Chemical Formula 4 is a group of the following Chemical Formula 5.

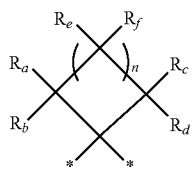

Chemical Formula 5

In the above Chemical Formula 5, $R_a$ to $R_f$ are the same or different, and are hydrogen, a C1 to C10 alkyl group, or a C6 to C20 aryl group, n is an integer ranging from 1 to 5, and "*" represents a point of connection to the hydroxy-substituted benzene group of Chemical Formula 3.

Examples of the compound represented by Chemical Formula 1 include 4,4'-biphenol, 1,1,1-tris(4-hydroxyphenyl)ethane, α,α,α'-tris(2-hydroxyphenyl)-1-ethyl-4-isopropylbenzene (also known as 4-[4-[1,1-bis(4-hydroxyphenyl)ethyl]]-alpha,alpha-dimethylbenzylphenol), dihydroxyphenyl ether, or the like.

The aryl polyol compound comprising at least two aryl groups fused to each other may be represented by the following Chemical Formula 2.

$(OH)_r$—$Ar_3$—$(OH)_s$  Chemical Formula 2

In the above Chemical Formula 2, $Ar_3$ is a substituted or unsubstituted fused C10 to C30 aryl group, a substituted or unsubstituted fused C7 to C30 arylalkyl group, a substituted or unsubstituted fused C2 to C30 heteroaryl group, or a combination thereof, and r and s are the same or different and are an integer ranging from 1 to 5.

In a specific embodiment, $Ar_3$ is a substituted or unsubstituted fused C10 to C30 aryl group, r and s are the same or different and are an integer ranging from 1 to 3.

Examples of the compound represented by Chemical Formula 2 include 2,7-dihydroxynaphthalene, or 1,5-dihydroxynaphthalene, or the like.

The second monomer, the benzene substituted with at least two hydroxyl groups may be represented by the following Chemical Formula 6.

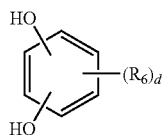

Chemical Formula 6

In the above Chemical Formula 6, $R_6$ is selected from hydrogen, a hydroxyl group, a substituted or unsubstituted C1 to C10 alkyl group, a substituted or unsubstituted C1 to C10 alkoxy group, —NR$^a$R$^b$, —OR$^a$, —NH(CO)R$^a$, —OC(O)R$^a$, a substituted or unsubstituted C6 to C18 aryl group, —CH=CR$^a$, or a combination thereof wherein R$^a$ and R$^b$ are the same or different and are hydrogen or a substituted or unsubstituted C1 to C10 alkyl group, and d is an integer of 1 or 2, specifically 1, more specifically 2.

In a specific embodiment, R$_6$ is selected from hydrogen, a hydroxyl group, a substituted or unsubstituted C1 to C10 alkyl group, a substituted or unsubstituted C1 to C10 alkoxy group, or a combination thereof, and d is an integer of 1 or 2.

Examples of the benzene substituted with at least two hydroxyl groups include resorcinol, hydroquinone, catechol, phloroglucinol, or a combination thereof. Resorcinol can be specifically mentioned.

The first monomer may be included in an amount of about 1 to about 1000 parts by weight, specifically 10 to 900 parts by weight, more specifically about 100 to about 800 parts by weight, based on 100 parts by weight of the second monomer. When the first monomer is used within the foregoing range, an aerogel having low shrinkage and excellent adiabatic properties may be provided.

The aldehyde compound may be selected from formaldehyde, acetaldehyde, propionaldehyde, butyraldehyde, benzaldehyde, furaldehyde, or glutaraldehyde, or a combination thereof.

The aldehyde compound may be included in an amount of about 0.5 to about 5 moles, specifically about 1 to about 4 moles, more specifically about 3 moles, based on the total amount of 1 mole of the aryl groups of the first monomer and the second monomer. In an embodiment, the aldehyde compound may be included in an amount of about 1.5 to about 3 moles, based on 1 mole of the aryl group of the first monomer and the second monomer. When the aldehyde compound is used within the foregoing range, an aerogel having excellent adiabatic properties may be provided.

Without being bound by theory, it is believed that a structural unit of the polymer is positioned between the hydroxy benzenes by polymerization of the first monomer and the second monomer. For example, when the first monomer is an aryl polyol compound of the above Chemical Formula 1 including at least two aryl groups linked to each other by a linker, the polymer may be represented by the following Chemical Formula 1A.

Chemical Formula 1A

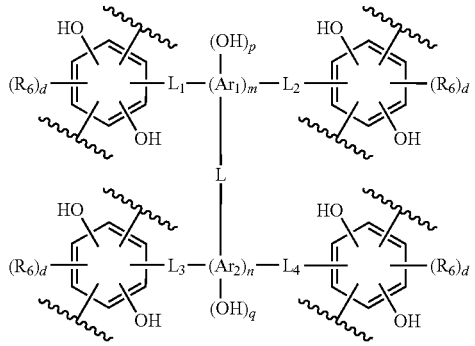

In the above Chemical Formula 1A,

Ar$_1$, Ar$_2$, L, n, m, p, and q are the same as in Chemical Formula 1, and R$_6$ and d are the same as in Chemical Formula 6, and L$_1$ to L$_4$ are the same or different, and are residual groups from reaction of the first and second monomer. The residual groups, L$_1$ to L$_4$ may be different depending on kinds of aldehyde compounds and catalysts.

For example, when the monomer is an aryl polyol compound comprising at least two aryl groups fused to each other of the above Chemical Formula 2, the polymer may be represented by the following Chemical Formula 2A.

Chemical Formula 2A

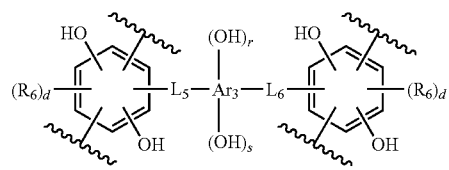

In the above Chemical Formula 2A,

Ar$_3$, r, and s are the same as in Chemical Formula 2, and R$_6$ and d are the same as in Chemical Formula 6, L$_5$ and L$_6$ are the same or different, and are residual groups from reaction of the first and second monomer. The residual groups, L$_5$ and L$_6$ may be different depending on kinds of aldehyde compounds and catalysts.

A polymer composition may comprise a polymer of Chemical Formula 1A, a polymer of Chemical Formula 2A, or a combination thereof.

While not wanting to be bound by theory, it is believed that a polymer of the above Chemical Formula 1A and/or 2A may include a structural unit derived from the monomer of Chemical Formula 1 and/or Chemical Formula 2 between hydroxyl group-containing benzenes. Such polymers may provide an aerogel having high mechanical strength, flexibility, and low shrinkage during the manufacturing process.

The aerogel may have a pore size (e.g. average largest pore size) of about 1 to about 70 nanometers (nm), specifically about 2 to about 60 nm, more specifically about 4 to about 50 nm, and may have porosity of about 80 to about 99 percent (%), specifically about 82 to about 98%, more specifically about 84 to about 96%, based on the total volume of the aerogel. The porosity of the aerogel may include nanometer sized pores having the above pore size and a high specific surface area. The aerogel may have a specific surface area of about 200 to about 800 square meters per gram (m$^2$/g), specifically about 250 to about 750 m$^2$/g, more specifically about 300 to about 700 m$^2$/g, and in an embodiment, may have a specific surface area of about 300 to about 600 m$^2$/g. When the aerogel has a pore size, porosity, and specific surface area within the foregoing range, an aerogel having excellent adiabatic and sound absorption properties may be provided.

While not wanting to be bound by theory, it is believed that because the aerogel fabricated by drying a wet gel prepared by polymerizing monomers has a microstructure comprising branch-shaped clusters and a plurality of pores, it has high structural strength and flexibility. Due to such high structural strength and flexibility, the pores are not collapsed during their preparation process and provide a selected pore size resulting in a high specific surface area and the desirable adiabatic properties of the aerogel. The aerogel has shrinkage of about 50% or less, based on the total volume of a wet gel, and in an embodiment, has a shrinkage of about 20% or less, based on the volume of a wet gel.

Hereinafter, a method of preparing the above aerogel is further disclosed.

The aerogel is prepared as a wet gel by polymerizing a composition for preparing an aerogel.

The composition for preparing an aerogel includes a solution obtained by contacting a first monomer selected from an aryl polyol compound comprising at least two aryl groups linked to each other by a linker, an aryl polyol compound including at least two aryl groups fused to each other, or a combination thereof, a second monomer including a benzene substituted with at least two hydroxyl groups, an aldehyde compound, and a solvent.

The first monomer, the second monomer, and aldehyde compound are the same as described above.

The composition for preparing an aerogel may further include a catalyst. Examples of the catalyst include an inorganic acid catalyst such as hydrochloric acid (HCl), hydrogen bromide (HBr), or sulfuric acid ($H_2SO_4$), or the like, or a combination thereof, or an organic acid catalyst such as acetic acid, p-toluenesulfonic acid, or trifluoroacetic acid, or the like, or a combination thereof; an inorganic base catalyst such as sodium hydroxide (NaOH), sodium hydrogen carbonate ($NaHCO_3$), potassium hydroxide (KOH), potassium hydrogen carbonate ($KHCO_3$), ammonium hydroxide ($NH_4OH$) or the like, or a combination thereof, or an organic base catalyst such as an amine compound, or the like, or a combination thereof. In an embodiment, the catalyst is an acid catalyst.

The catalyst may be used in an amount of about 0.01 to about 10 moles, specifically about 0.05 to about 5 moles, more specifically about 0.1 to about 1 mole, based on 100 moles of the aryl groups of the first monomer and the second monomer.

The solvent may be an organic solvent, and the organic solvent may include dimethyl formamide, acetone, 1,4-dioxane, tetrahydrofuran, dimethyl sulfoxide, toluene, benzene, dichlorobenzene, acetonitrile, or an alcohol (e.g., methanol, ethanol, isopropanol, or the like), or a combination thereof.

The amount of the solvent may be selected according to the target density of an aerogel.

A polymer is obtained through a radical reaction of the composition for preparing an aerogel, and then an aerogel is obtained by a sol-gel reaction.

The wet gel may undergo a solvent exchange reaction, and the solvent may comprise any solvent which is miscible with liquid carbon dioxide, without limitation. However, when the wet gel is dried under atmospheric pressure or the solvent used during the preparation of the wet gel has sufficient compatibility with carbon dioxide, a solvent exchange process may be omitted.

Subsequently, the wet gel is dried. The drying is performed, for example, by supercritical drying, atmospheric pressure drying, lyophilizing (e.g., by reduced pressure drying), or a combination thereof.

The supercritical drying may comprise contacting with supercritical carbon dioxide. First, liquid carbon dioxide is supplied to a high-pressure reactor to remove solvent in a wet gel. Then the temperature and pressure of the high-pressure reactor are raised over the threshold points of carbon dioxide, and the carbon dioxide is slowly removed (e.g., ejected) under reduced pressure. The supercritical drying may be performed at room temperature, and has good processability and safety.

The atmospheric pressure drying method may comprise drying the wet gel through a heating process at atmospheric pressure. When the solvent is removed through the atmospheric pressure drying method, the resulting product is called a xerogel, which is a type of aerogel.

Lyophilizing (or reduced pressure drying) is a method of removing solvent by freezing the wet gel including an aqueous solution and reducing the pressure to sublimate ice. When the solvent is removed through the lyophilizing (or reduced pressure drying) process, the resulting product is called a cryogel, which is a type of aerogel.

The aerogel according to an embodiment undergoes negligible shrinkage during a solvent exchange process and a drying process, and thus may retain pores after drying.

When the second monomer including a benzene substituted with at least two hydroxyl groups and an aldehyde compound are used during polymerization without the first monomer, it is may be difficult to obtain a large-scale aerogel, because the sol-gel reaction and aging can occur over more than 10 days, severe shrinkage may occur during a sol-gel reaction and a gel drying process, and sufficient mechanical strength may thus not be obtained. When the first monomer is used, the sol-gel reaction and aging time may be shortened to within 24 hours, shrinkage may be decreased, and it is easy to obtain a large-scale aerogel.

Because the aerogel has excellent adiabatic properties and sound absorption properties, it may be applied to a cooling device, such as a refrigerator or a freezer, it may be used as an adiabatic material for an aerospace application, it may be used for cryogenic storage such as for liquid natural gas ("LNG") and freight vessels, it may be used as an adiabatic material for piping, buildings, and construction, it may be used as an adiabatic fabric for clothing and shoes, it may be used as a catalyst carrier, and it may be used as a sound absorption material or a vibration reduction material. Also, through pyrolysis, the aerogel may be converted to be a carbon aerogel and thus it may be used as an electrode material.

Hereinafter, this disclosure is illustrated in further detail with reference to examples. However, the examples are exemplary embodiments of this disclosure and shall not be limiting.

Preparation of Aerogel

Example 1

A composition for preparing an aerogel is prepared by adding 8.7 milliliters (mL) of acetonitrile and 0.5 mL of dimethyl formamide to a cylindrical polypropylene vial, and dissolving 0.28 grams (g) of 4,4'-biphenol ("BP"), 0.33. g of resorcinol, 1.0 g of formaldehyde, and 0.06 mL of 1.5 molar (M) HCl. The composition for preparing an aerogel is vigorously agitated at room temperature for 1 minute. Then, the mixture is slowly heated until the reaction temperature reaches 60° C. over a period of about 10 minutes. Next, formation of a gel is identified by fluidity on the interface, and it is matured at 60° C. for 12 hours.

The prepared wet gel is exchanged with acetone, which is a solvent having good compatibility with liquid carbon dioxide. Then, the liquid carbon dioxide is provided to a high pressure reactor to remove the acetone inside the wet gel.

When the acetone inside the wet gel is removed, a monolith aerogel is prepared by increasing its temperature and pressure beyond the threshold temperature of carbon dioxide and then slowly removing the carbon dioxide at the same temperature to reduce the pressure.

Example 2

An aerogel is prepared according to the same method as Example 1, except for using bisphenol A ("BisA") instead of 4,4'-biphenol.

Example 3

An aerogel is prepared according to the same method as Example 1, except for using dihydroxyphenylether ("DHPE") instead of 4,4'-biphenol.

Example 4

An aerogel is prepared according to the same method as Example 1, except for using 1,1,1-tris(4-hydroxyphenyl)methane ("THPM") instead of 4,4'-biphenol.

Example 5

An aerogel is prepared according to the same method as Example 1, except for using 1,1,1-tris(4-hydroxyphenyl)ethane (THPE) instead of 4,4'-biphenol.

Example 6

An aerogel is prepared according to the same method as Example 1, except for using α,α,α'-tris(2-hydroxyphenyl)-1-ethyl-4-isopropylbenzene ("THPEB") instead of 4,4'-biphenol.

Example 7

An aerogel is prepared according to the same method as Example 1, except for using 2,7-dihydroxynaphthalene ("2,7-DHN") instead of 4,4'-biphenol.

Example 8

An aerogel is prepared according to the same method as Example 1, except for using 1,5-dihydroxynaphthalene ("1,5-DHN") instead of 4,4'-biphenol.

Comparative Example 1

A composition for preparing an aerogel is prepared by adding 5.5 mL of acetonitrile to a cylindrical polypropylene vial, and dissolving 0.33 g of resorcinol, 0.5 mL of formaldehyde, and 0.03 mL of 1.5 M HCl. An aerogel is prepared using the composition for preparing an aerogel through the same method as Example 1.

Comparative Example 2

A composition for preparing an aerogel is prepared by adding 6 mL of acetonitrile to a cylindrical polypropylene vial, and dissolving 0.37 g of resorcinol, 0.31 g of phenol, 0.97 mL of formaldehyde, and 0.1 mL of 1.5M HCl. An aerogel is prepared using the composition for preparing an aerogel through the same method as Example 1.

The aerogels prepared according to Examples 1 to 6 and Comparative Examples 1 and 2 are measured with respect to density, specific surface area, average pore size, and thermal conductivity.

The results are shown in Table 1.

The average pore sizes are measured using a Barrett-Joyner-Halenda ("BJH") adsorption-desorption isotherm, and specific surface areas are measured with a specific surface analyzer, TriStar3200 (Micromeritics Instruments, USA), at 77 Kelvin (K). The thermal conductivity is measured with a heat flow meter (Mathis TCi) using a modified Hot-Wire method.

TABLE 1

|  | Aryl polyol | Density $(g/m^3)$ | Average pore size (nm) | Specific surface area, $(m^2/g)$ | Thermal conductivity (mW/mK) | Linear shrinkage (%) |
| --- | --- | --- | --- | --- | --- | --- |
| Example 1 | BP | 0.11 | 10.61 | 356.40 | 20.9 | 18.0 |
| Example 2 | BisA | 0.14 | 9.59 | 341.13 | 15.2 | 15.0 |
| Example 3 | DHPE | 0.14 | 12.17 | 319.11 | 15.9 | 22.0 |
| Example 4 | THPM | 0.15 | 12.12 | 324.63 | 15.9 | 16.0 |
| Example 5 | THPE | 0.13 | 12.86 | 319.11 | 15.5 | 16.0 |
| Example 6 | THPEB | 0.14 | 12.17 | 324.63 | 17.0 | 16.0 |
| Example 7 | 2,7-DHN | 0.16 | 18.31 | 452.39 | 16.1 | 15.0 |
| Example 8 | 1,5-DHN | 0.15 | 15.52 | 524.83 | 17.1 | 14.7 |
| Comparative Example 1 | — | 0.19 | 14.82 | 346.34 | 15.4 | 21.9 |
| Comparative Example 2 | — | 0.18 | 9.87 | 332.54 | 16.3 | 19.8 |

Referring to Table 1, the aerogels prepared according to Examples 1 to 8 have an average pore size within the range of 1 to 50 nm while maintaining a low density.

FIG. 1 provides a graph showing a nitrogen ($N_2$) adsorption-desorption isotherm of the aerogel according to Example 1. Referring to FIG. 1, the nitrogen adsorption or desorption amount is changed depending on pressure, showing that the organic aerogel has nanometer size pores.

Figure 2:
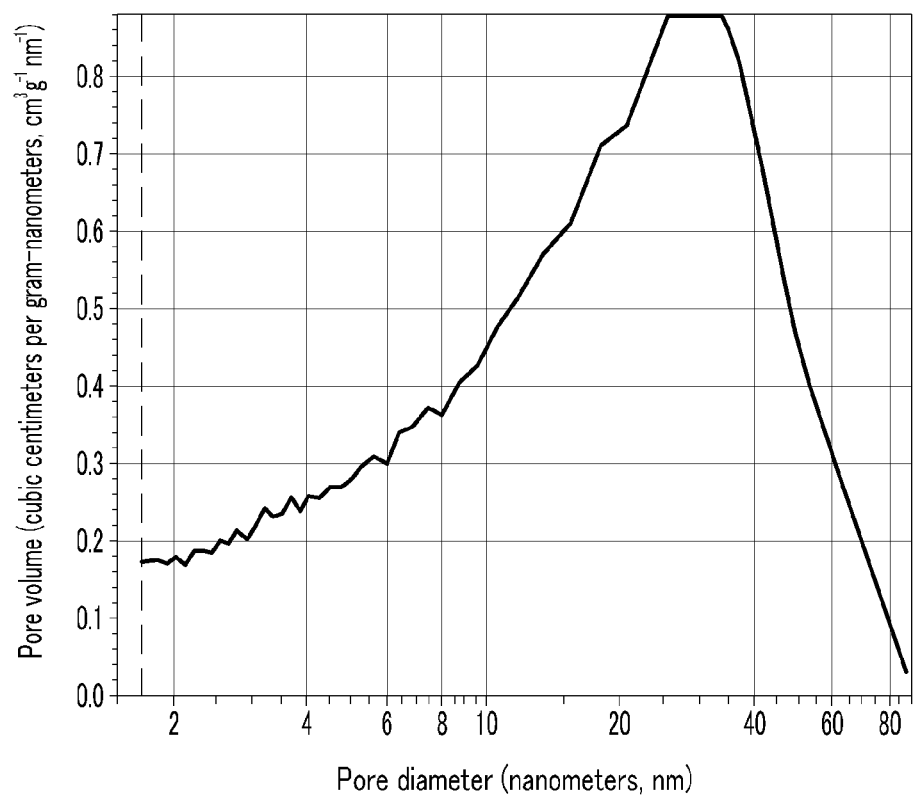
FIG. 2 is a graph of pore volume (cubic centimeters per gram-nanometers) versus pore diameter (nanometers) showing the pore size distribution of an organic aerogel prepared according to Example 1.

FIG. 2 is a graph showing the pore size distribution of the aerogels according to Example 1. Referring to FIG. 2, the aerogels according to Example 1 include a large amount of pores having a particular size. The pores have a highly uniform size. While not wanting to be bound by theory, it is believed that the uniform pore size is because they are not destroyed but are maintained during the solvent exchange and drying steps.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An aerogel composition for preparing an aerogel, the aerogel composition comprising:
a first monomer selected from
an aryl polyol compound comprising at least two aryl groups linked to each other by a linker,
an aryl polyol compound including at least two aryl groups fused to each other, or
a combination thereof;
a second monomer including a benzene substituted with at least two hydroxyl groups;
a third monomer of an aldehyde compound; and
a solvent, wherein the solvent comprises an organic solvent.

2. The aerogel composition of claim 1, wherein the aryl polyol compound comprising at least two aryl groups linked to each other by a linker is represented by the following Chemical Formula 1:

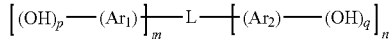  Chemical Formula 1 wherein, in the above Chemical Formula 1,
$Ar_1$ and $Ar_2$ are the same or different, and are each independently a substituted or unsubstituted C6 to C30 aryl group, a substituted or unsubstituted C3 to C30 heteroaryl group, or a substituted or unsubstituted C7 to C30 alkylaryl group, or a combination thereof,
L is
a single bond, —O, —C(O)—, —S—, —S(O)$_2$—, —PO—, —P(RR'R")— wherein R, R', and R" are the same or different, and are hydrogen, a C1 to C10 alkyl group, or a C6 to C20 aryl group, or
a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C12 to C18 arylalkylaryl group, a substituted or unsubstituted C1 to C30 heteroalkyl group, a substituted or unsubstituted C2 to C30 heterocycloalkyl group, or a substituted or unsubstituted C2 to C30 alkenyl group, or
a combination thereof,
n and m are the same or different and are an integer ranging from 1 to about 5, with the proviso that n+m is selected so that a valence of L is not exceeded, and
p and q are the same or different and are an integer ranging from 1 to 4.

3. The aerogel composition of claim 1, wherein the aryl polyol compound comprising at least two aryl groups fused to each other is represented by the following Chemical Formula 2:

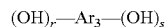  Chemical Formula 2 wherein, in the above Chemical Formula 2,
$Ar_3$ is a substituted or unsubstituted fused C10 to C30 aryl group, a substituted or unsubstituted fused C7 to C30 arylalkyl group, or a substituted or unsubstituted fused C2 to C30 heteroaryl group, or a combination thereof, and
r and s are the same or different and are an integer ranging from 1 to 5.

4. The aerogel composition of claim 1, wherein the aryl polyol compound including at least two aryl groups linked to each other by a linker is represented by the following Chemical Formula 3:

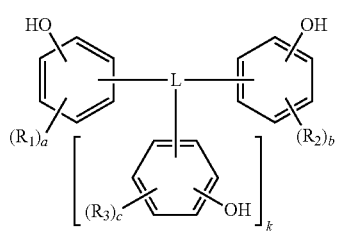  Chemical Formula 3 wherein, in the above Chemical Formula 3,
L is
a single bond, —O—, —C(O)—, —S—, —S(O)$_2$—, —P(O)—, —P(RR'R")— wherein R, R', and R" are the same or different and are hydrogen, a C1 to C10 alkyl group, or a C6 to C20 aryl group, or
a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C12 to C18 arylalkylaryl group, a substituted or unsubstituted C1 to C30 heteroalkyl group, a substituted or unsubstituted C2 to C30 heterocycloalkyl group, or a substituted or unsubstituted C2 to C30 alkenyl group, or
a combination thereof,
$R_1$, $R_2$, and $R_3$ are the same or different, and are hydrogen, a substituted or unsubstituted C1 to C10 alkyl group, a substituted or unsubstituted C1 to C10 alkoxy group, —NR$^a$R$^b$, —OR$^a$, —NH(CO)R$^a$, —OC(O)R$^a$, a substituted or unsubstituted C6 to C18 aryl group, a phenyl group, or —CH=CR$^a$, or a combination thereof, wherein R$^a$ and R$^b$ are the same or different and are hydrogen or a substituted or unsubstituted C1 to C10 alkyl group,
a, b, and c are the same or different and are an integer ranging from 0 to 4, and
k is an integer ranging from 0 to 3.

5. The aerogel composition of claim 4, wherein at least one of $R_1$, $R_2$, and $R_3$ is a substituted or unsubstituted C1 to C10 alkyl group, a substituted or unsubstituted C1 to C10 alkoxy group, $-NR^aR^b$, $-OR^a$, $-NH(CO)R^a$, $-OC(O)R^b$, a substituted or unsubstituted C6 to C18 aryl group, a phenyl group, or $-CH=CR^a$, or a combination thereof.

6. The aerogel composition of claim 1, wherein the solvent comprises dimethyl formamide, acetone, 1,4-dioxane, tetrahydrofuran, dimethyl sulfoxide, toluene, benzene, dichlorobenzene, acetonitrile, or an alcohol, or a combination thereof.

7. The aerogel composition of claim 1, wherein the second monomer is unsubstituted or substituted with a substituted or unsubstituted C1 to C10 alkyl group, a substituted or unsubstituted C1 to C10 alkoxy group, $-NR^aR^b$, $-OR^a$, $-NH(CO)R^a$, $-OC(O)R^a$, a substituted or unsubstituted C6 to C18 aryl group, or $-CH=CR^a$, or a combination thereof, wherein $R^a$ and $R^b$ are the same or different and are hydrogen or a substituted or unsubstituted C1 to C10 alkyl group.

8. An aerogel composition comprising:
a first monomer comprising a compound represented by Chemical Formula 1, Chemical Formula 2, or a combination thereof:

Chemical Formula 1

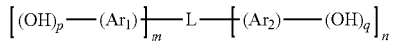

Chemical Formula 2

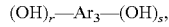

wherein, in the above Chemical Formula 1,
$Ar_1$ and $Ar_2$ are the same or different, and are a substituted or unsubstituted C6 to C30 aryl group,
L is
a single bond, $-O-$, $-C(O)-$, $-S-$, $-S(O)_2$
a substituted or unsubstituted C1 to C30 alkyl group,
a substituted or unsubstituted C6 to C30 aryl group, a substituted or unsubstituted C7 to C30 arylalkyl group, a substituted or unsubstituted C12 to C18 arylalkylaryl group, or a combination thereof,
n and m are the same or different and are an integer ranging from 1 to 3, with the proviso that n+m is selected so that a valence of L is not exceeded, and
p and q are the same or different and are an integer ranging from 1 to 4,
wherein in Chemical Formula 2,
$Ar_3$ is a substituted or unsubstituted fused C10 to C30 aryl group, and
r and s are the same or different and are an integer ranging from 1 to 3;
a second monomer represented by the following Chemical Formula 6:

Chemical Formula 6

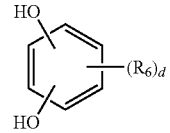

wherein in the above Chemical Formula 6,
$R_6$ is selected from hydrogen, a hydroxyl group, a substituted or unsubstituted C1 to C10 alkyl group, a substituted or unsubstituted C1 to C10 alkoxy group, or a combination thereof, and
d is an integer of 1 or 2;
a third monomer of an aldehyde compound; and
a solvent, wherein the solvent comprises an organic solvent.

* * * * *